(12) United States Patent
Li et al.

(10) Patent No.: US 10,692,486 B2
(45) Date of Patent: Jun. 23, 2020

(54) FOREST INFERENCE ENGINE ON CONVERSATION PLATFORM

(71) Applicant: INTERNATIONAL BUSINESS MACHINES CORPORATION, Armonk, NY (US)

(72) Inventors: Qi Cheng Li, Beijing (CN); David Nahamoo, Great Neck, NY (US); Shao Chun Li, Beijing (CN); Li Jun Mei, Beijing (CN); Ya Bin Dang, Beijing (CN); Jie Ma, Nanjing (CN); Xin Zhou, Beijing (CN); Jian Wang, Beijing (CN); Hao Chen, Beijing (CN); Yi Peng Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/046,301

(22) Filed: Jul. 26, 2018

(65) Prior Publication Data
US 2020/0035221 A1 Jan. 30, 2020

(51) Int. Cl.
| | | |
|---|---|---|
| G10L 15/08 | (2006.01) | |
| G06N 5/04 | (2006.01) | |
| G10L 15/14 | (2006.01) | |
| G10L 15/10 | (2006.01) | |
| G10L 15/18 | (2013.01) | |

(52) U.S. Cl.
CPC ............. *G10L 15/083* (2013.01); *G06N 5/04* (2013.01); *G10L 15/10* (2013.01); *G10L 15/14* (2013.01); *G10L 15/1815* (2013.01)

(58) Field of Classification Search
CPC ....... G10L 15/083; G10L 15/10; G10L 15/14; G06N 5/04
USPC .................................................. 704/254, 270
See application file for complete search history.

(56) References Cited

U.S. PATENT DOCUMENTS

| | | | |
|---|---|---|---|
| 5,995,952 A * | 11/1999 | Kato | ..................... G06N 3/0427 706/15 |
| 8,365,019 B2 | 1/2013 | Sailer et al. | |
| 8,645,122 B1 * | 2/2014 | Di Fabbrizio | .......... G10L 21/00 704/9 |
| 9,710,525 B2 | 7/2017 | Dhoopar et al. | |
| 9,830,249 B2 | 11/2017 | Anand et al. | |
| 10,262,654 B2 * | 4/2019 | Hakkani-Tur | .......... G10L 15/20 |

(Continued)

*Primary Examiner* — Akwasi M Sarpong
(74) *Attorney, Agent, or Firm* — Tutunjian & Bitetto, P.C.; Joseph Petrokaitis

(57) ABSTRACT

A computer-implemented method, computer program product, and computer processing system are provided for generating inferences from a forest of predefined problem determination trees using a processor-based conversation platform. The method includes selecting a tree from among the forest of predefined problem determination trees, responsive to user utterances uttered during an inference generating session. The method further includes navigating the tree to allocate a relevant tree node to generate a problem diagnosis question or a problem resolution action by understanding the user utterances among common interaction patterns in problem diagnosis and problem resolution dialogs. The method also includes providing speech for uttering the problem diagnosis question or the problem resolution action to a user.

18 Claims, 19 Drawing Sheets

(56) References Cited

U.S. PATENT DOCUMENTS

| | | | | |
|---|---|---|---|---|
| 2003/0033145 | A1* | 2/2003 | Petrushin | G10L 17/26 704/236 |
| 2003/0067477 | A1* | 4/2003 | Hidesawa | G06Q 10/00 715/700 |
| 2004/0062520 | A1* | 4/2004 | Gutta | G11B 27/034 386/249 |
| 2004/0111261 | A1* | 6/2004 | Chaudhari | G10L 17/08 704/236 |
| 2004/0165210 | A1* | 8/2004 | Jamison | G06F 11/2294 358/1.15 |
| 2005/0147291 | A1* | 7/2005 | Huang | G06K 9/00288 382/159 |
| 2006/0143493 | A1* | 6/2006 | Meis | H04L 41/06 714/47.1 |
| 2006/0288286 | A1* | 12/2006 | Chandler | H04L 41/06 715/716 |
| 2007/0038461 | A1* | 2/2007 | Abbott | G10L 15/30 704/275 |
| 2007/0061128 | A1* | 3/2007 | Odom | G06F 19/325 704/4 |
| 2009/0055684 | A1* | 2/2009 | Jamjoom | G06F 11/0709 714/26 |
| 2010/0275267 | A1* | 10/2010 | Walker | G07F 9/023 726/26 |
| 2010/0318846 | A1* | 12/2010 | Sailer | G06F 11/0748 714/26 |
| 2010/0332229 | A1* | 12/2010 | Aoyama | G06K 9/00221 704/251 |
| 2011/0238710 | A1* | 9/2011 | Barritz | G06F 21/105 707/E17.005 |
| 2012/0290297 | A1* | 11/2012 | Baughman | G10L 17/22 704/233 |
| 2014/0059010 | A1* | 2/2014 | Uchida | H04N 7/155 707/661 |
| 2014/0125451 | A1* | 5/2014 | Sako | H05B 47/155 340/4.2 |
| 2014/0244252 | A1* | 8/2014 | Dines | G10L 15/183 704/235 |
| 2015/0100583 | A1* | 4/2015 | Xi | G06F 16/285 707/738 |
| 2015/0277842 | A1* | 10/2015 | Huang | H04N 7/152 348/14.07 |
| 2015/0350372 | A1* | 12/2015 | Griffin | H04L 67/306 348/14.07 |
| 2016/0269254 | A1* | 9/2016 | Forney | H04L 67/22 |
| 2017/0134446 | A1* | 5/2017 | Kitada | H04L 12/1822 |
| 2017/0269982 | A1 | 9/2017 | Gaza et al. | |
| 2017/0270930 | A1* | 9/2017 | Ozmeral | G10L 17/005 |
| 2018/0101281 | A1* | 4/2018 | Nelson | G06F 3/04817 |
| 2018/0101760 | A1* | 4/2018 | Nelson | H04L 65/403 |
| 2018/0144746 | A1* | 5/2018 | Mishra | G10L 25/51 |
| 2019/0014209 | A1* | 1/2019 | Hamme | H04M 3/436 |
| 2019/0108221 | A1* | 4/2019 | Nelson | G06F 40/58 |
| 2019/0108492 | A1* | 4/2019 | Nelson | G06N 20/00 |

* cited by examiner

| ID | Problem | Symtoms | Relevant |
|---|---|---|---|
| 1 | Diagnosis network connectivity | Not open web site, pin fail | 0.6 |
| 2 | Diagnosis network configuration | Configuration warning | 0.4 |
| 3 | Diagnosis network interface card | Network card error | 0.4 |
| 4 | Diagnosis digital certificate | Digital certification expired | 0.2 |

User: I cannot open any website.
Agent: What kind of connection?
User: I don't know.
Agent: Is the wireless light of laptop shinning?
User" No.
Agent: Thus is a physical connection issue. Please follow these steps to fix the physical connection issue
User: Sorry, the wireless light is now on.
Agent: What does the connection icon look like in your task bar? Connected, disconnected, or connecting with warning?
User: Connected with warning and I received an email last week that reminded me to update the digital certification.
Agent: What is your laptop's OS?
User: Windows.
Agent: Please follow these steps to update your digital certification.

User: I cannot open website.
Agent: What kind of connection?
User: Wi-Fi
Agent: Is the wireless light of laptop shining?
User: Light is on.
Agent: What does the connection icon look like in your task bar? Connected, disconnected or connected with warning?
User: I do not know.

FIG. 17

FOREST INFERENCE ENGINE ON CONVERSATION PLATFORM

BACKGROUND

Technical Field

The present invention generally relates to information processing, and more particularly to a forest inference engine on a conversation platform.

Description of the Related Art

In information processing such as problem determination and resolution, knowledge (e.g., technical support domain knowledge) has been represented as a tree structure involving multiple trees, where the multiple trees form a "forest" (also interchangeably referred to herein as a "forest knowledge graph"). However, there is a lack of a user-friendly way to interact with the forest in order to derive and/or otherwise obtain information therefrom. Hence, there is a need for such a user-friendly way to interact with a forest relating to problem determination and resolution.

SUMMARY

According to an aspect of the present invention, a computer-implemented method is provided for generating inferences from a forest of predefined problem determination trees using a processor-based conversation platform. The method includes selecting a tree from among the forest of predefined problem determination trees, responsive to user utterances uttered during an inference generating session. The method further includes navigating the tree to allocate a relevant tree node to generate a problem diagnosis question or a problem resolution action by understanding the user utterances among common interaction patterns in problem diagnosis and problem resolution dialogs. The method also includes providing speech for uttering the problem diagnosis question or the problem resolution action to a user.

According to another aspect of the present invention, a computer program product is provided for generating inferences from a forest of predefined problem determination trees using a processor-based conversation platform. The computer program product includes a non-transitory computer readable storage medium having program instructions embodied therewith. The program instructions are executable by a computer to cause the computer to perform a method. The method includes selecting a tree from among the forest of predefined problem determination trees, responsive to user utterances uttered during an inference generating session. The method further includes navigating the tree to allocate a relevant tree node to generate a problem diagnosis question or a problem resolution action by understanding the user utterances among common interaction patterns in problem diagnosis and problem resolution dialogs. The method also includes providing speech for uttering the problem diagnosis question or the problem resolution action to a user.

According to yet another aspect of the present invention, a computer processing system is provided for generating inferences from a forest of predefined problem determination trees using a processor-based conversation platform. The system includes a memory for storing program code. The system further includes a processor operatively coupled to the memory for running the program code to select a tree from among the forest of predefined problem determination trees, responsive to user utterances uttered during an inference generating session. The processor further runs the program code to navigate the tree to allocate a relevant tree node to generate a problem diagnosis question or a problem resolution action by understanding the user utterances among common interaction patterns in problem diagnosis and problem resolution dialogs. The processor also runs the program code to provide speech for uttering the problem diagnosis question or the problem resolution action to a user.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 13 is a diagram showing a table that includes various tree related information, in accordance with an embodiment of the present invention;

FIG. 14 is a diagram showing the conversation between a user and the system, in accordance with an embodiment of the present invention;

FIG. 17 is a diagram showing the conversation between a user and the system, in accordance with an embodiment of the present invention;

DETAILED DESCRIPTION

The present invention is directed to a forest inference engine on a conversation platform.

In an embodiment, the present invention provides a forest inference engine configured to assist a user to intuitively interact with a forest knowledge graph in order to address the user's problem in a conversational manner. In an embodiment, the forest inference engine is configured as a conversational inference engine used to iteratively understand, determine, and solve a user's problem via a multi-round contextual conversation, in which the engine selects (or switches) to a correct (most relevant) tree from among a set of predefined problem determination trees (i.e., the so-called "forest" or "forest knowledge graph", and also navigates the tree to allocate the right node to generate a problem diagnosis question or problem resolution action based on an understanding of the user's statement among common interaction patterns in dialogs relating to diagnosing and resolving the user's problem.

Figure 1:
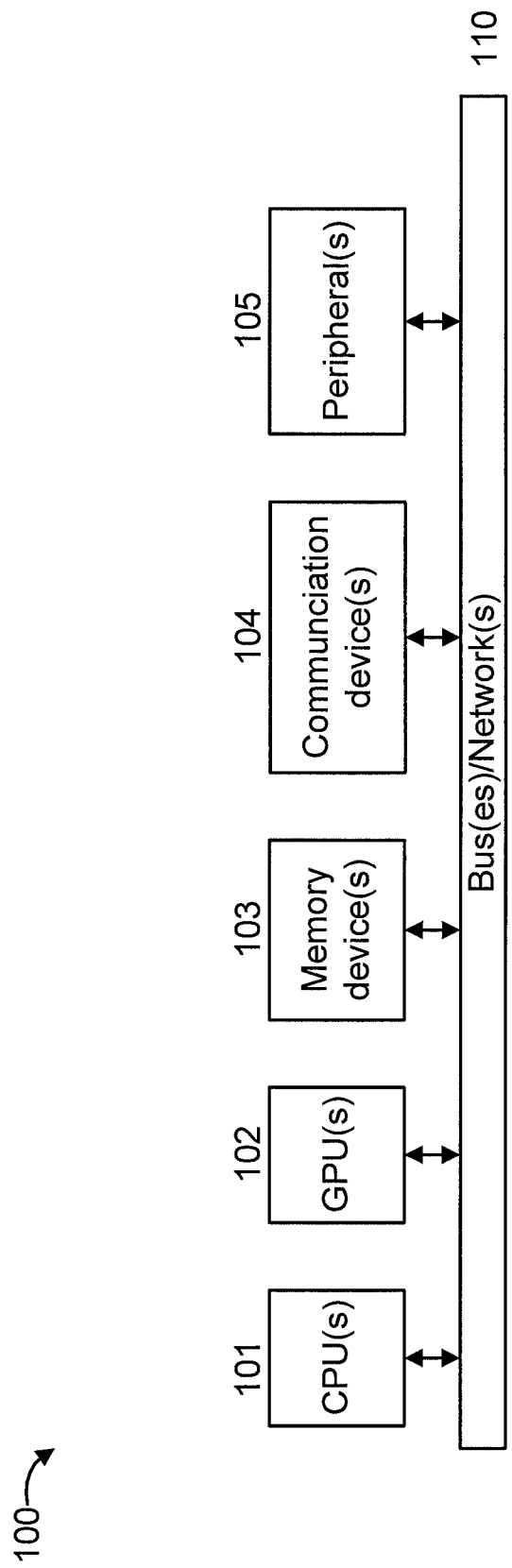
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, key value or other types of databases, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, a microphone, a speaker, and so forth. The microphone and speaker can be used to facilitate a conversation between the user and the system. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 18-19). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
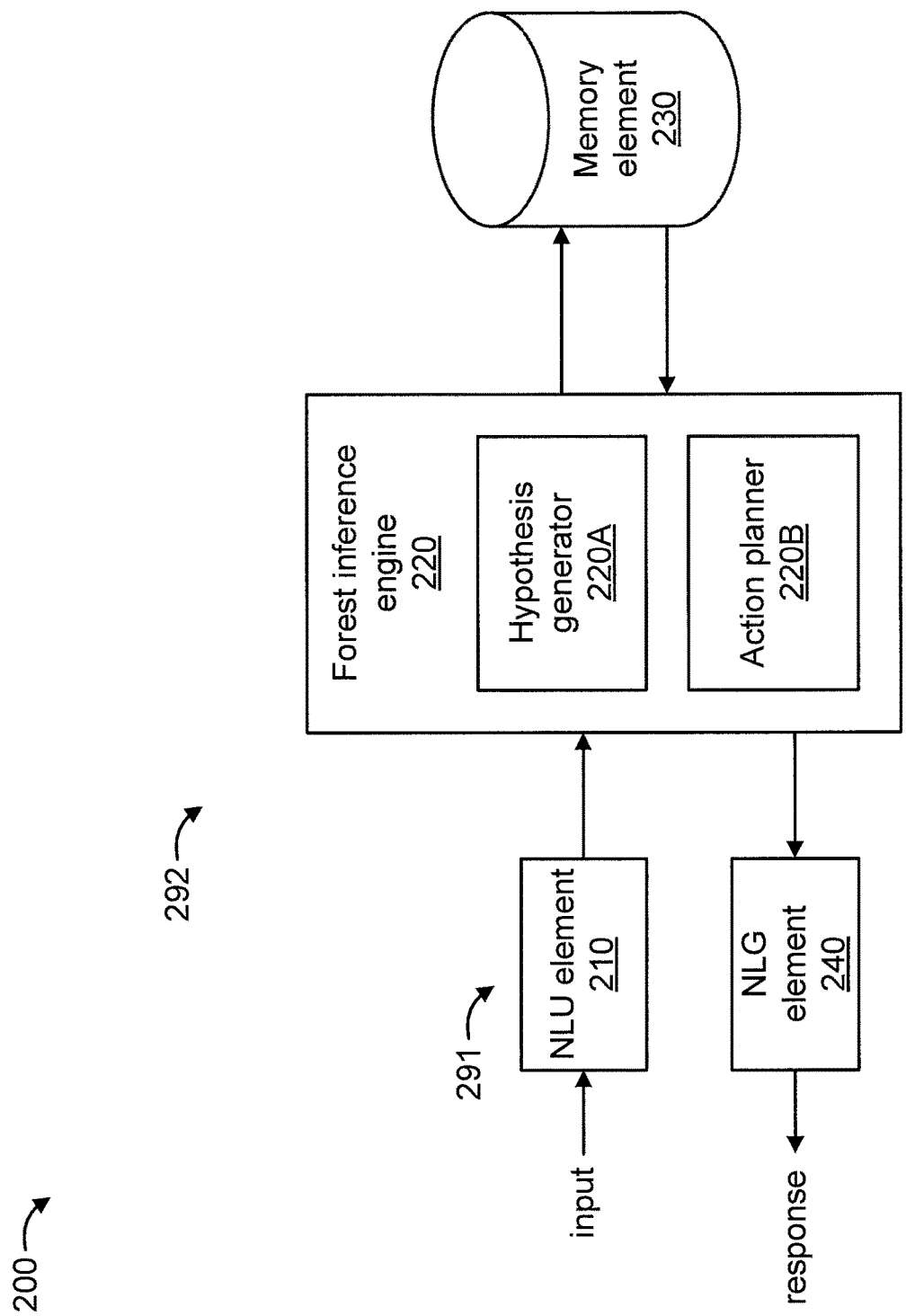
FIG. 2 is a block diagram showing an exemplary forest inference system, in accordance with an embodiment of the present invention.

For example, it is to be appreciated that system 200 described below with respect to FIG. 2 is a system for implementing respective embodiments of the present invention. Part or all of processing system 100 may be implemented in one or more of the elements of system 200.

Figure 5:
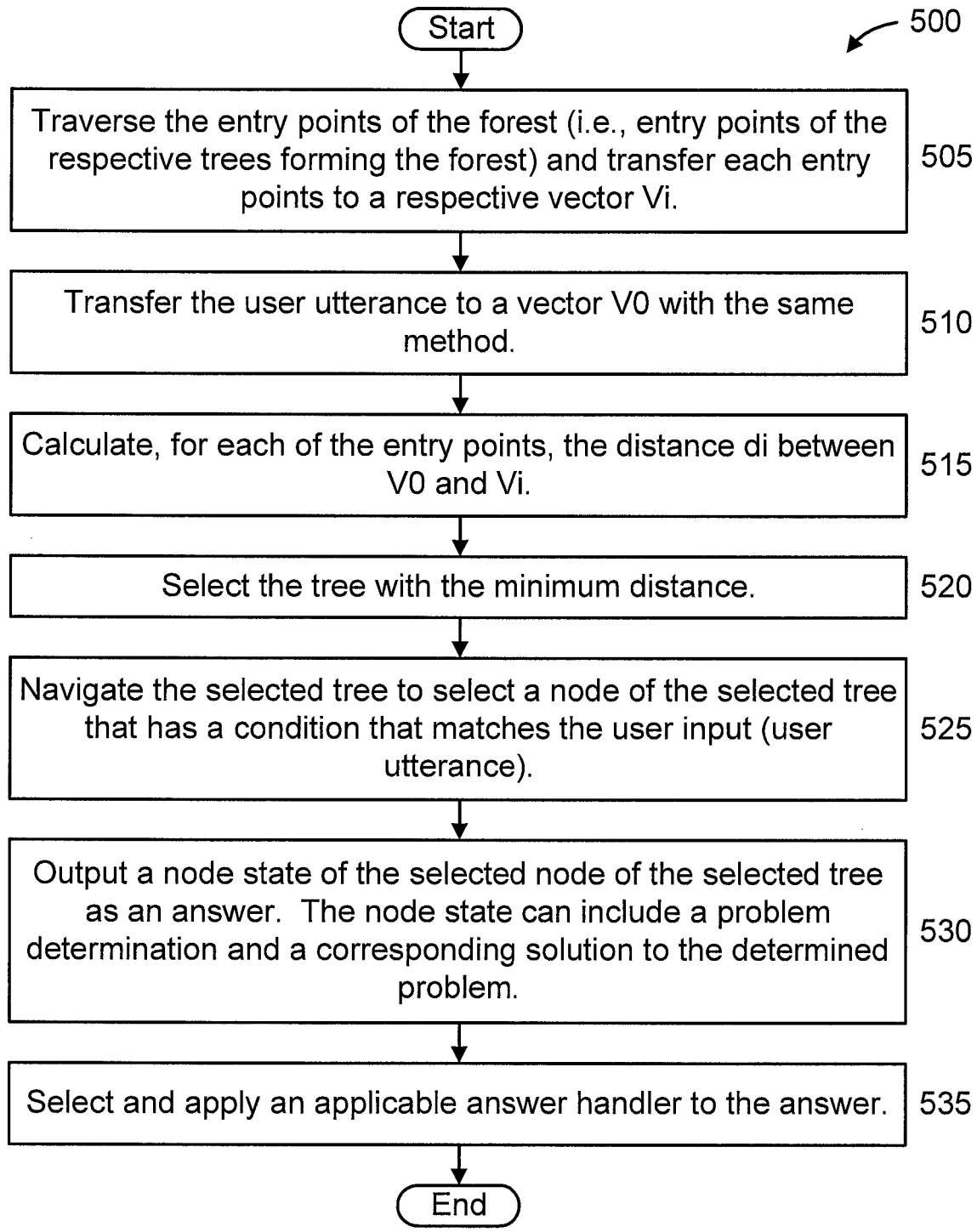
FIG. 5 is a flow diagram showing an exemplary method for generating a forest inference on a conversation platform, in accordance with an embodiment of the present invention.
Figure 6:
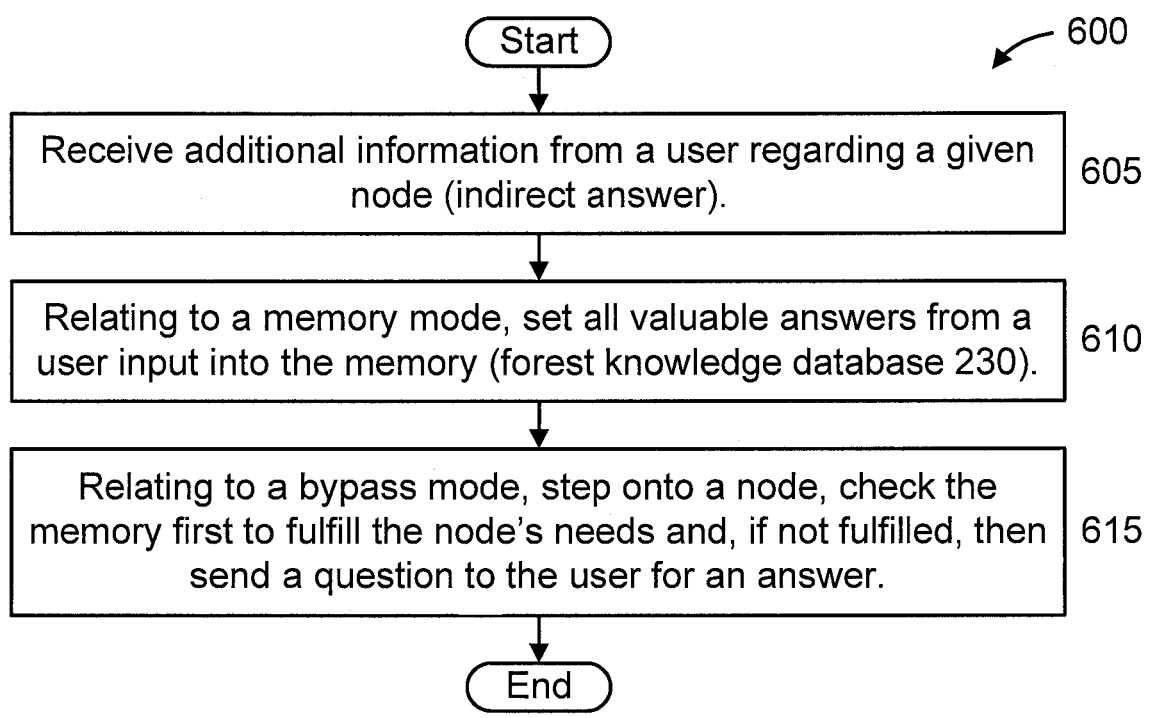
FIG. 6 is a flow diagram showing an exemplary method of operation of a forward answer handler, in accordance with an embodiment of the present invention.
Figure 7:
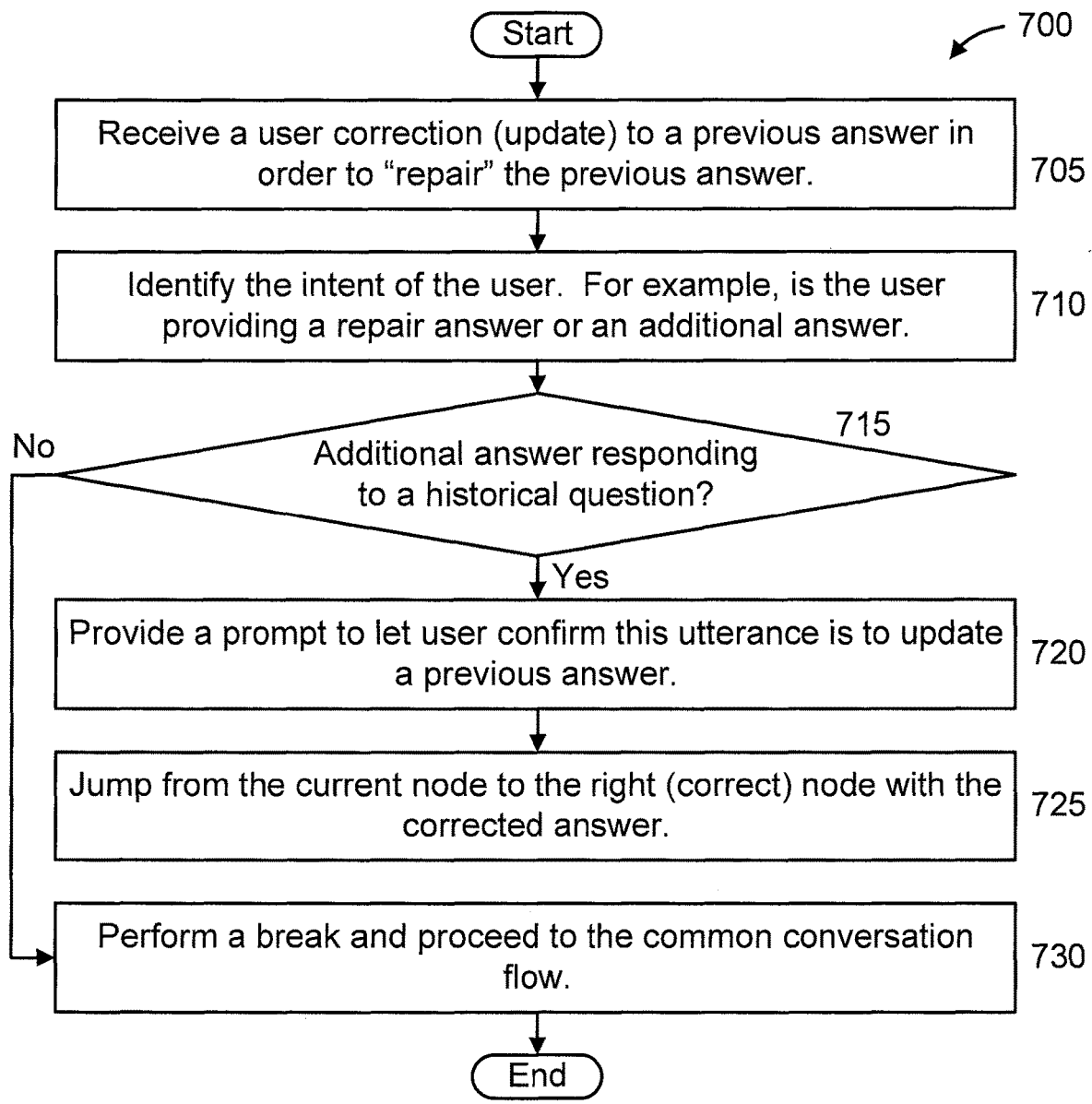
FIG. 7 is a flow diagram showing an exemplary method of operation of a repairing answer handler, in accordance with an embodiment of the present invention.
Figure 8:
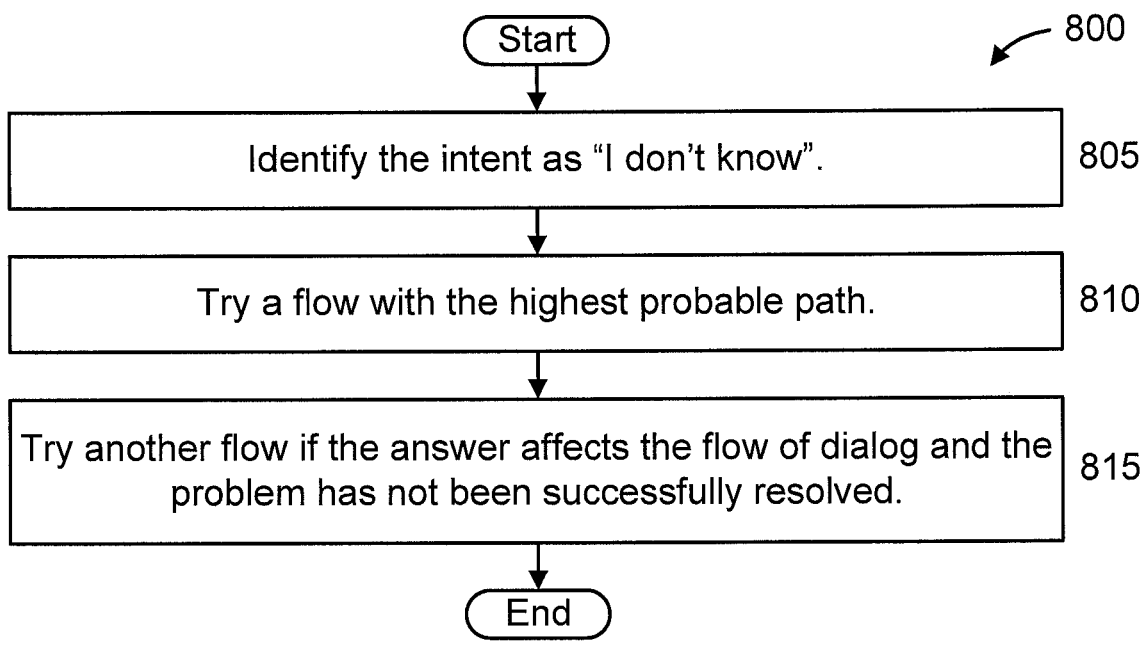
FIG. 8 is a flow diagram showing an exemplary method for processing an "I don't know answer pattern", in accordance with an embodiment of the present invention.
Figure 9:
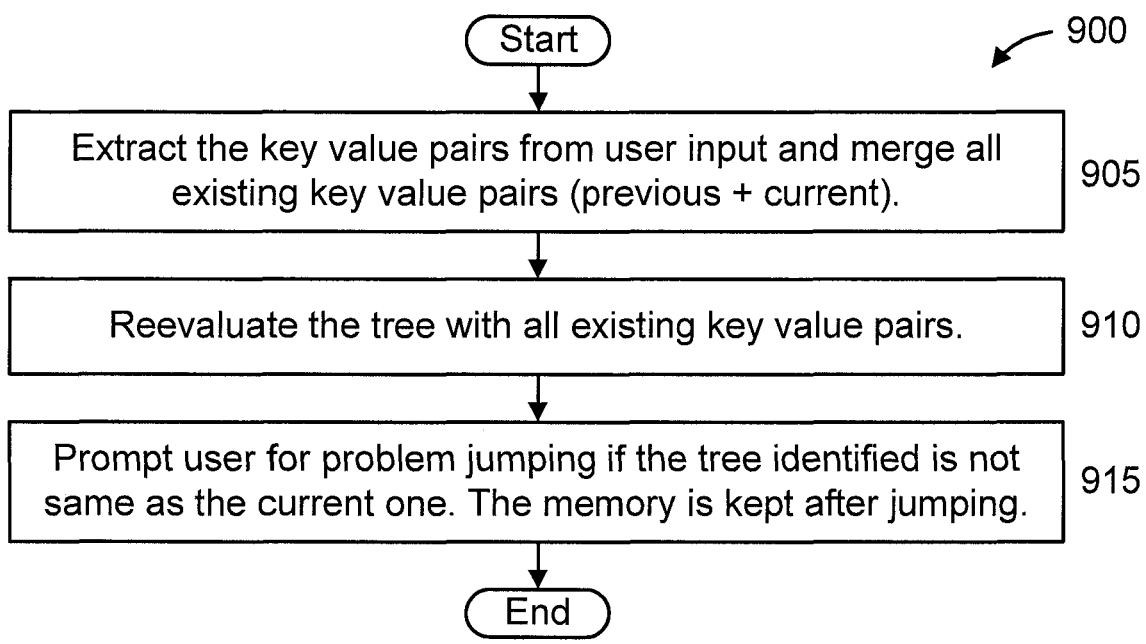
FIG. 9 is a flow diagram showing an exemplary method for processing a "jumping answer pattern", in accordance with an embodiment of the present invention.

Further, it is to be appreciated that processing system 100 may perform at least part of the method described herein including, for example, at least part of method 500 of FIG. 5 and/or at least part of method 600 of FIG. 6 and/or at least part of method 700 of FIG. 7 and/or at least part of method 800 of FIG. 8 and/or at least part of method 900 of FIG. 9. Similarly, part or all of system 200 may be used to perform at least part of at least part of method 500 of FIG. 5 and/or at least part of method 600 of FIG. 6 and/or at least part of method 700 of FIG. 7 and/or at least part of method 800 of FIG. 8 and/or at least part of method 900 of FIG. 9.

FIG. 2 is a block diagram showing an exemplary forest inference system 200, in accordance with an embodiment of the present invention. System 200 can be considered to be a conversation platform for interacting with a forest knowledge graph.

The system 200 includes a Natural Language Understanding (NLU) element 210, a forest inference engine 220, a memory element (also interchangeably referred to herein as a forest knowledge database) 230, and a Natural Language Generation (NLG) element 240. The forest inference engine 220 includes a hypothesis generator 220A and an action planner 220B.

The NLU element 210 receives a natural language input from a user and provides a representation of the natural language input to the forest inference engine 220.

The memory element 230 stores a forest knowledge graph 230A that is accessed by the forest inference engine 220.

The NLG element 240 generates a natural language output for the user. In this way, using the NLU element 210 and the NLG element 240, the user can interact with the forest knowledge graph 230A in a conversational manner, thus providing a user friendly and intuitive interface.

Figure 3:
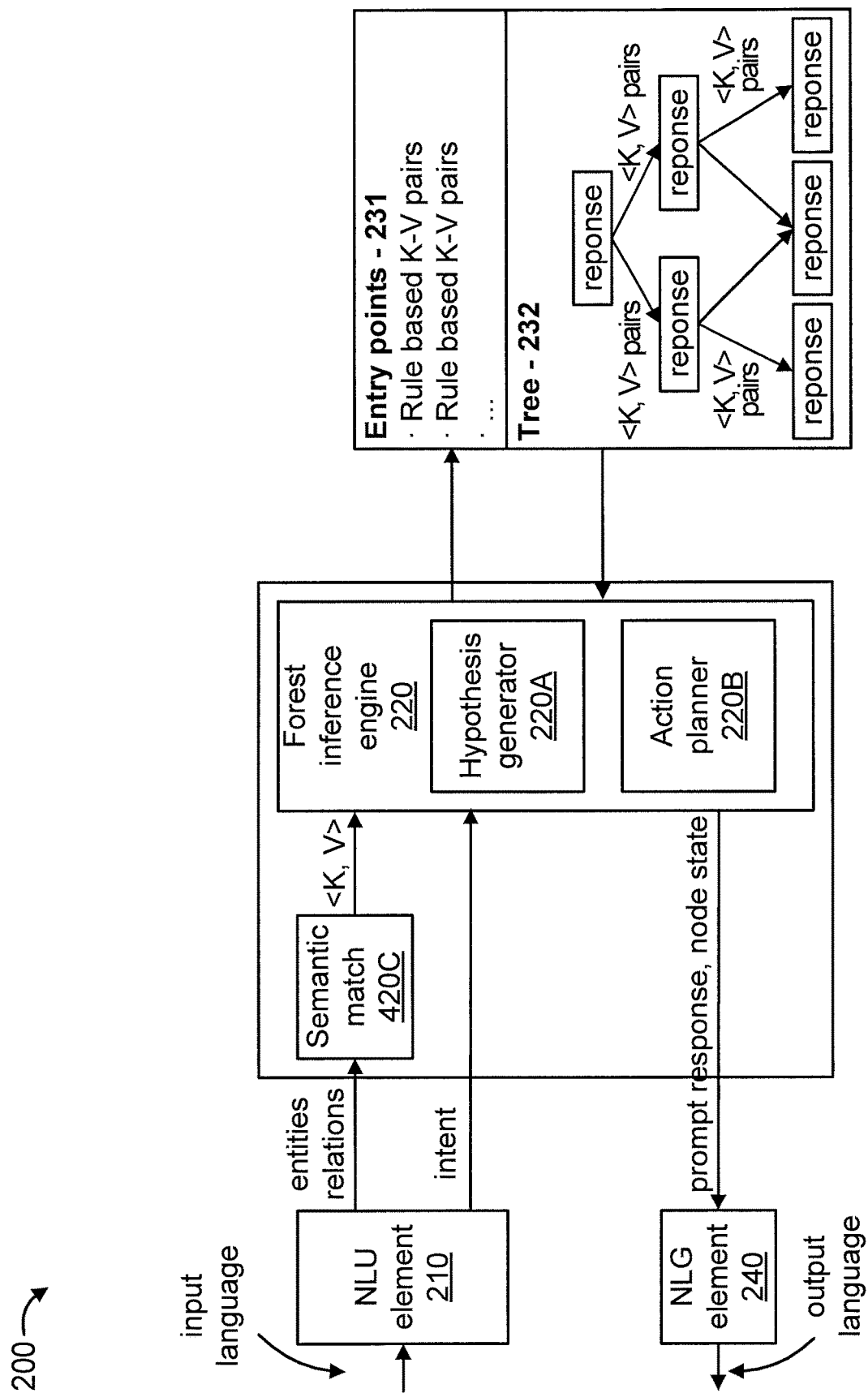
FIG. 3 is a block diagram further showing various aspects of system, in accordance with an embodiment of the present invention.

Moreover, in an embodiment, the system 200 can be considered to include a front-end (or user-side end) 291 and a backend 292. The front-end 291 can be configured to perform Automatic Speech Recognition (ASR) on user utterances using an ASR system. The back-end 292 can be configured to perform Text-To-Speech (TTS) generation on information provided to the user using a TTS generator. In this way, conversation between the user and the system 200 can occur. In an embodiment, the front-end 291 can be implemented by the NLU element 210 and the NLG element 240 (or some other element(s) of system 200). In another embodiment, the output to the user can already be converted to speech, such that it is simply output to the user using a speaker. The backend 292 can be considered to include the forest inference engine FIG. 3 is a block diagram further showing various aspects of system 200, in accordance with an embodiment of the present invention.

The NLU element 210 performs Natural Language Understanding (NLU). In an embodiment, the NLU can be based on, for example, but not limited to, Named Entity Recognition (NER), intent identification, dependency parsing, and so forth.

In an embodiment, the NLU unit outputs an intent of the user's input to the forest inference engine 220. In an embodiment, the NLU element 210 further outputs entities relations to a semantic matching element 420C that pre-processes the output of the NLU unit 210 in order to provide an input to the forest inference engine 220. The semantic matching element 420C pre-processes the entities relations and outputs a key value pair <K, V> that is input to the forest inference engine 220.

The forest inference engine 220 receives and processes the key value pair <K, V> and the intent in order to output a semantic key value pair <K, V> that is used to search the memory element 230 in order to extract tree and node information therefrom.

The memory element 230 stores forest knowledge. The forest knowledge can be organized into a set of entry points 231 and a forest of trees 232. In an embodiment, the memory element 230 can be key-value database. In an embodiment, the entry points in the set can be rule-based K-V pairs. The trees are organized such that each tree node represents a response with links that connect the nodes represented by K-V pairs.

Figure 4:
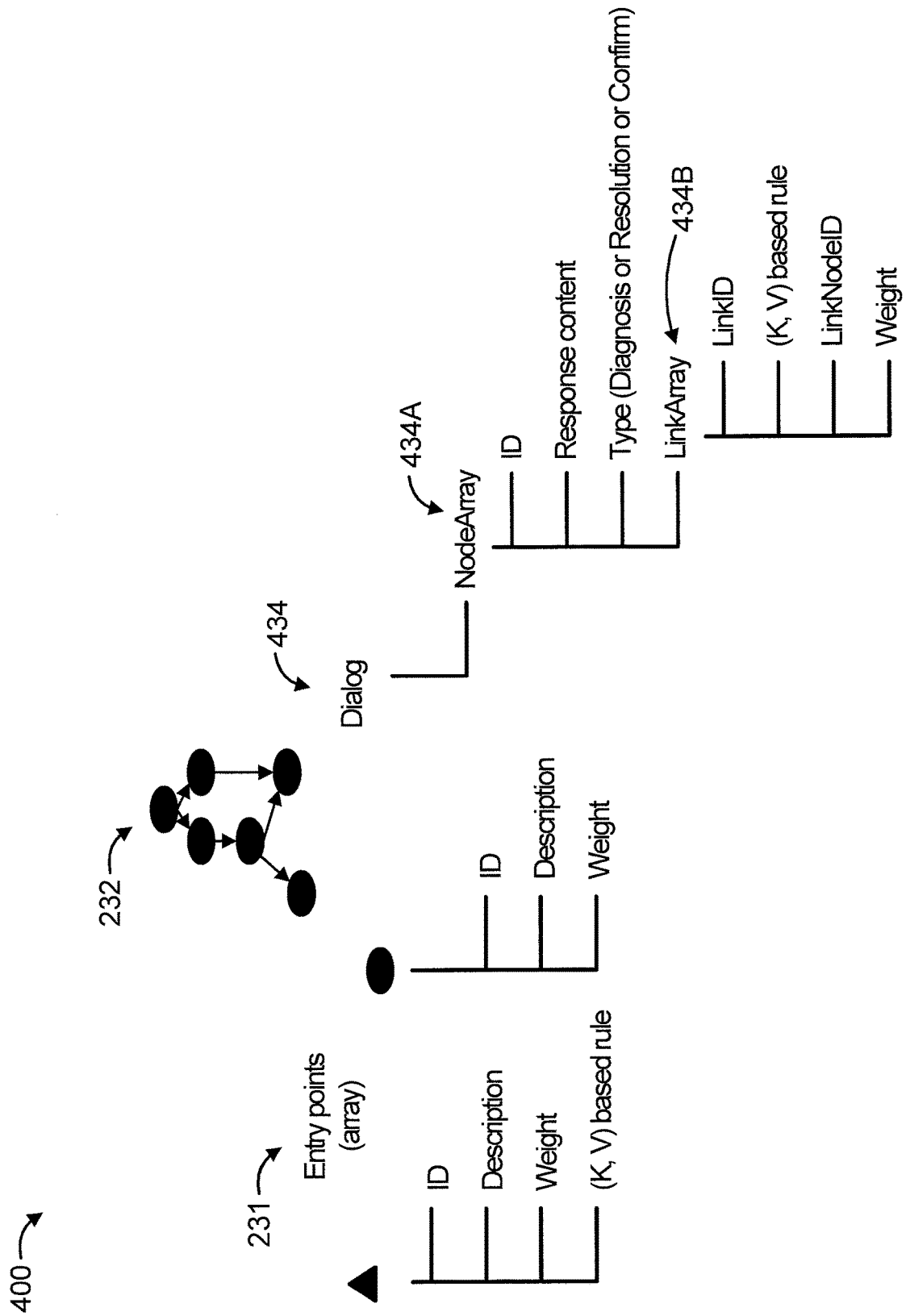
FIG. 4 is a block diagram showing an exemplary arrangement of forest knowledge, in accordance with an embodiment of the present invention.

FIG. 4 is a block diagram showing an exemplary arrangement 400 of forest knowledge, in accordance with an embodiment of the present invention.

In an embodiment, each of the entry points 231 can be formed as an array that includes the following: an ID; a description; a weight; and a (K,V) based rule. The weight can be a symptoms weight, which represents the frequency the user mentioned a particular item (word, phrase, etc.).

In an embodiment, a respective tree 232 can be formed for each of multiple dialogs 434. In an embodiment, each of the dialogs 434 can be represented by the following: an ID; a description; and a weight. The weight can be a dialog weight, which represents the percentage the dialog resolved the problem.

Each of the dialogs 434 can be further broken down into a node array 434A and a link array 434B.

The node array 434 can be represented by the following: an ID; a response content; a type (diagnosis or resolution or confirm); and a link array 434B.

In an embodiment, the link array 434B can be represented by the following: a LinkID; a (K, V) based rule; a LinkNodeID; and a weight. The weight can be a link weight, which represents the frequency that the user went through (traversed) the link.

FIG. 5 is a flow diagram showing an exemplary method 500 for generating a forest inference on a conversation platform, in accordance with an embodiment of the present invention.

The method 500 can discover the correct (most relevant) tree from a forest of trees based on a user's inputs, even when the problems have a large volume and overlap, and even when the user's input are not complete and/or clear.

At block 505, traverse the entry points of the forest (i.e., entry points of the respective trees forming the forest) and transfer each entry points to a respective vector Vi.

At block 510, transfer the user utterance to a vector V0 with the same method.

At block 515, calculate, for each of the entry points, the distance di between V0 and Vi.

At block 520, select the tree with the minimum distance.

At block 525, navigate the selected tree to select a node of the selected tree that has a condition that matches the user input (user utterance).

At block 530, output a node state of the selected node of the selected tree as an answer. The node state can include a problem determination and a corresponding solution to the determined problem. In an embodiment, the system can be configured to automatically perform one or more actions response to certain node states. In another embodiment, the system can suggest one or more actions from the user to choose from, and then perform any selected actions. For example, a curative action to a problem can be performed, either automatically or responsive to a user selection. These and other applications of the output of the present invention are readily determined by one of ordinary skill in the art given the teachings of the present invention provided herein, while maintaining the spirit of the present invention.

At block 535, select and apply an applicable answer handler to the answer. For example, depending on the answer, a forward answer handler or a repairing answer handler can be applied to the answer. The operation of the forward answer handler is further described with respect to FIG. 6. The operation of the repairing answer handler is further described with respect to FIG. 7.

It is to be appreciated that the conversation between a user and the system 200 can involve an "I don't know answer pattern" or a "jumping answer pattern". A method for addressing an "I don't know answer pattern" is further described with respect to FIG. 8. A method for addressing a "jumping answer pattern" is further described with respect to FIG. 9.

FIG. 6 is a flow diagram showing an exemplary method 600 of operation of a forward answer handler, in accordance with an embodiment of the present invention. The method 600 involves a user providing more information at a given node (i.e., an indirect answer). The method 600 involves two possible flows for forwarding an answer provided by the user (versus the system 200). The first flow relates to a memory mode (block 610). The second flow (block 615) relates to a bypass mode. The forward answer handler is implemented by the forest inference engine 220.

At block 605, receive additional information from a user regarding a given node (indirect answer).

At block 610, relating to a memory mode, set all valuable answers from a user input into the memory (forest knowledge database 230).

At block 615, relating to a bypass mode, step onto a node, check the memory first to fulfill the node's needs and, if not fulfilled, then send a question to the user for an answer.

FIG. 7 is a flow diagram showing an exemplary method 700 of operation of a repairing answer handler, in accordance with an embodiment of the present invention. The repairing answer handler is implemented by the forest inference engine 220.

At block 705, receive a user correction (update) to a previous answer in order to "repair" the previous answer.

At block 710, identify the intent of the user. For example, is the user providing a repair answer or an additional answer.

At block 715, check whether the additional answer is responding to a historical question [ ]. If yes, proceed to block 720. Otherwise, this is not a "repair", so proceed to block 730.

At block 720, provide a prompt to let user confirm this utterance is to update a previous answer.

At block 725, jump from the current node to the right (correct) node with the corrected answer.

At block 730, perform a break and proceed to the common conversation flow.

FIG. 8 is a flow diagram showing an exemplary method 800 for processing an "I don't know answer pattern", in accordance with an embodiment of the present invention. The "I don't know answer pattern" corresponds to the case when the user is unable to provide any answer (no answer).

At block 805, identify the intent as "I don't know".

At block 810, try a flow with the highest probable path. The probabilities can be calculated based on historical conversation records. A structure mapping engine can be used to set the probability of every link.

At block 815, try another flow if the answer affects the flow of dialog and the problem has not been successfully resolved.

FIG. 9 is a flow diagram showing an exemplary method 900 for processing a "jumping answer pattern", in accordance with an embodiment of the present invention. The "jumping answer pattern" corresponds to the case when the user provides some additional information other than the answer required by the nodes (irrelevant answers).

At block 905, extract the key value pairs from user input and merge all existing key value pairs (previous+current).

At block 910, reevaluate the tree with all existing key value pairs.

At block 915, prompt user for problem jumping if the tree identified is not same as the current one. The memory is kept after jumping.

Figure 10:
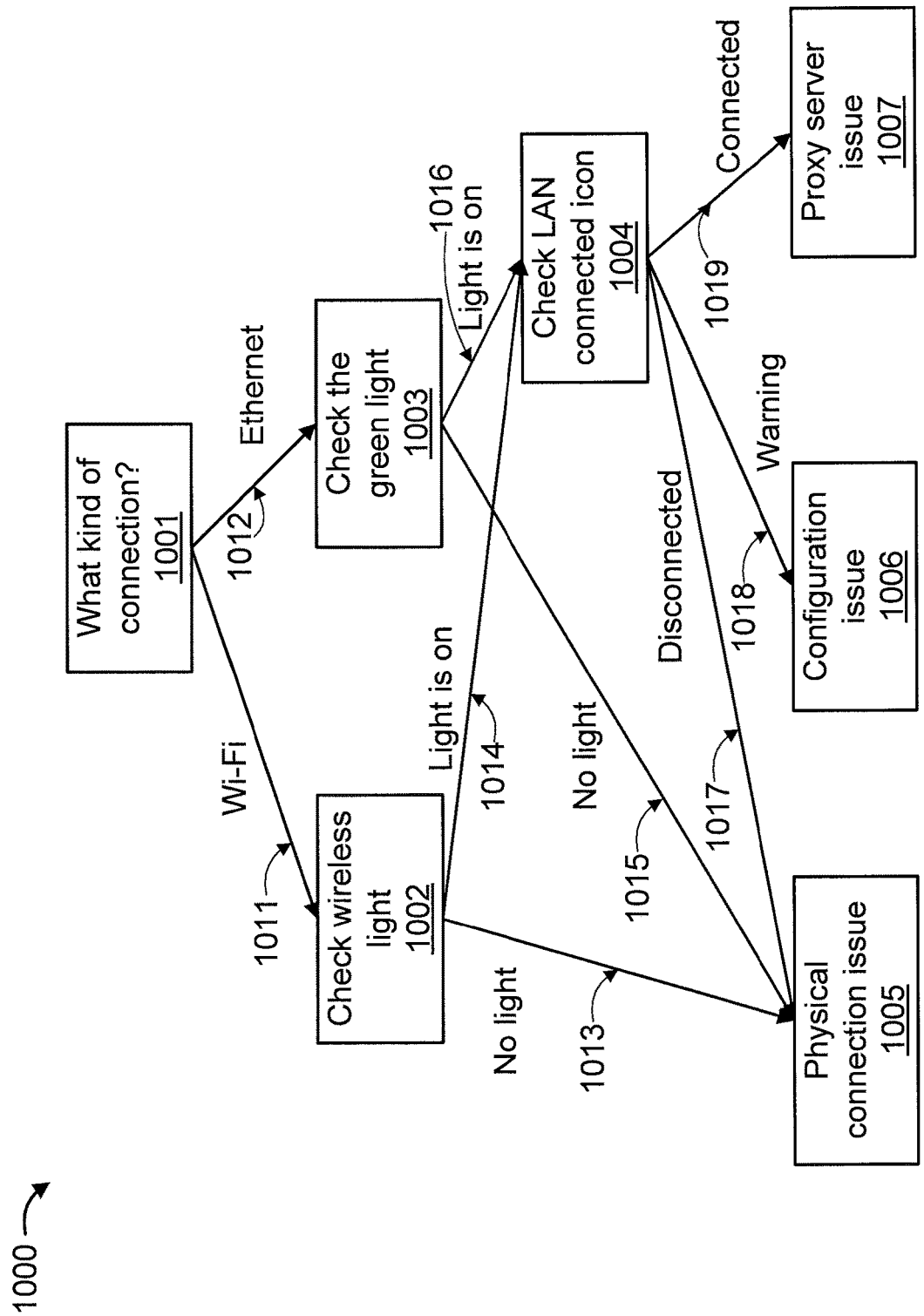
FIG. 10 is a block diagram showing an exemplary tree to which the present invention can be applied, in accordance with an embodiment of the present invention.

FIG. 10 is a block diagram showing an exemplary tree 1000 to which the present invention can be applied, in accordance with an embodiment of the present invention.

The tree 1000 includes various nodes 1001 through 1007, and links 1011 through 1019 connecting the various nodes.

The nodes 1001 through 1007 involve the following:
Node 1001: What kind of connection?
Node 1002: Check wireless light.
Node 1003: Check the green light.
Node 1004: Check LAN connected icon.
Node 1005: Physical connection issue.
Node 1006: Configuration issue.
Node 1007: Proxy server issue.

The links 1011 through 1019 involve the following:
Link 1011: Wi-Fi.
Link 1012: Ethernet.
Link 1013: No light.
Link 1014: Light is on.
Link 1015: No Light.
Link 1016: Light is on.
Link 1017: Disconnected.
Link 1018: Warning.
Link 1019: Connected.

Figure 11:
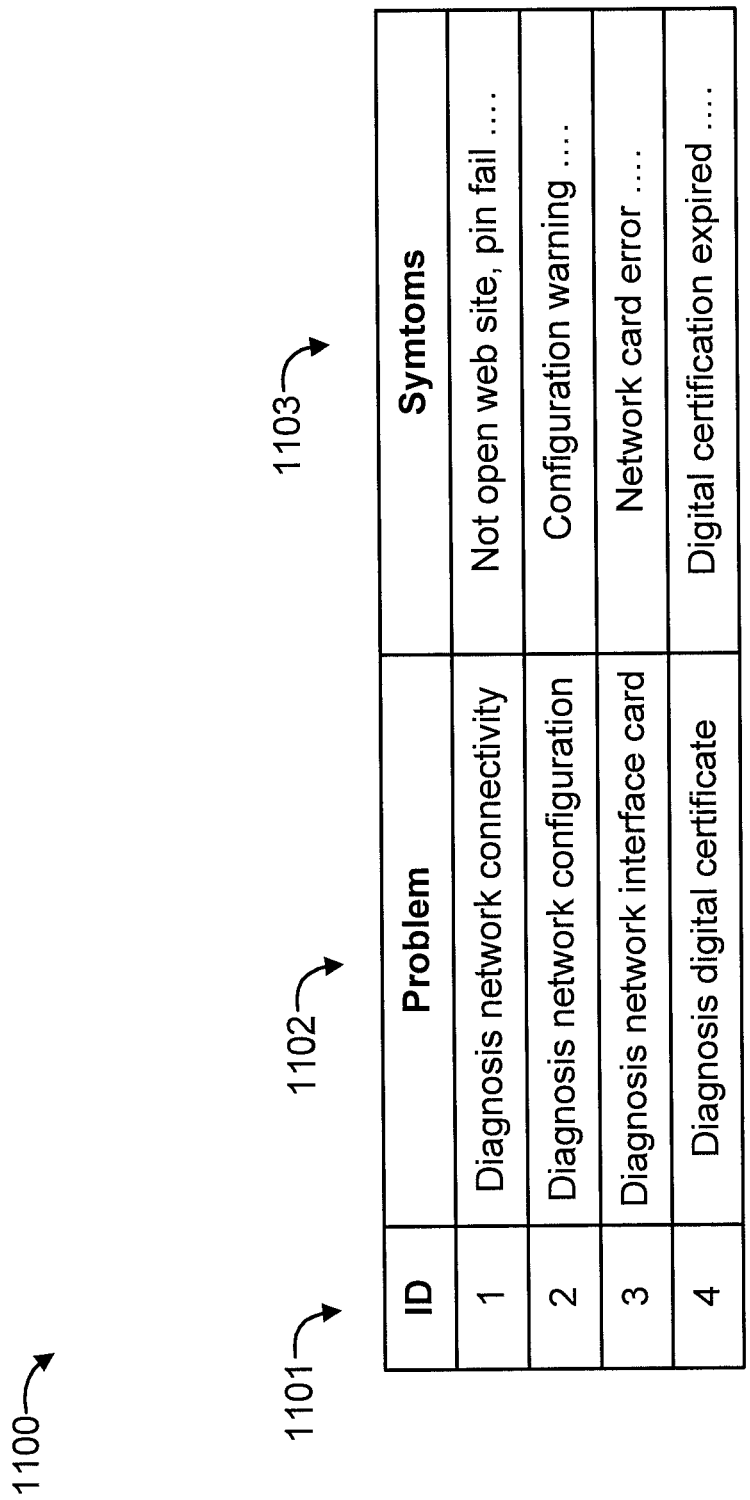
FIG. 11 is a diagram showing a table that includes various tree related information, in accordance with an embodiment of the present invention.

FIG. 11 is a diagram showing a table 1100 that includes various tree related information 1110, in accordance with an embodiment of the present invention.

The tree related information 1110 is shown relative to a table that includes a (tree) ID column 1101, a problem column 1102, and a symptoms column 1103.

The ID column 1101 specifies a tree corresponding to the problem indicated in the problem column 1102 as evidenced by the symptoms indicated in the symptoms column 1103.

Figure 12:
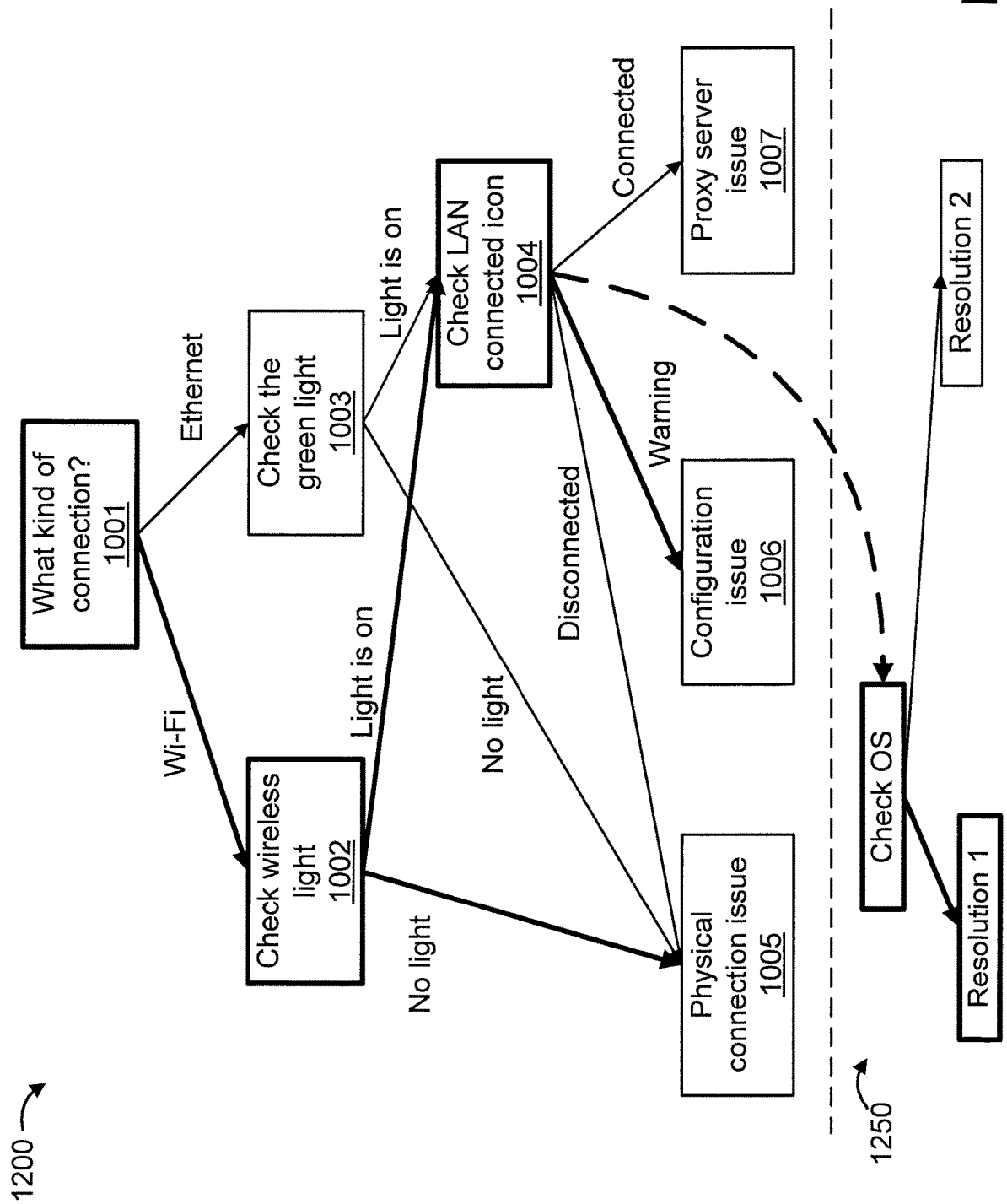
FIG. 12 is a diagram showing an exemplary tree to which the present invention can be applied, in accordance with an embodiment of the present invention.

FIG. 12 is a diagram showing an exemplary tree 1200 to which the present invention can be applied, in accordance with an embodiment of the present invention. FIG. 13 is a diagram showing a table 1300 that includes various tree related information 1310, in accordance with an embodiment of the present invention. FIG. 14 is a diagram showing the conversation 1400 between a user and the system 200, in accordance with an embodiment of the present invention.

The tree 1200 is a marked up version of tree 1000, with the marks (highlighted nodes) corresponding to the conversation 1400 between a user and (an agent of) the system 200. Moreover, FIG. 12 shows and includes a portion 1250 of another tree implicated by the $4^{th}$ problem from the top (diagnosis digital certification) in the table 1300 (as well as table 1100). Table 1300 differs from table 1100 in including a relevant column 1304 relating to a relevance of the trees/problems/symptoms relative to the conversation 1400. As can be seen, problem (ID) 1 is 60 percent (0.6) relevant, problem (ID) 2 is 40 percent (0.4) relevant, problem (ID) 3 is 40 percent (0.4) relevant, and problem (ID) 4 is 20 percent (0.2) relevant. The relevance percentage is essentially a matching percentage.

Figure 15:
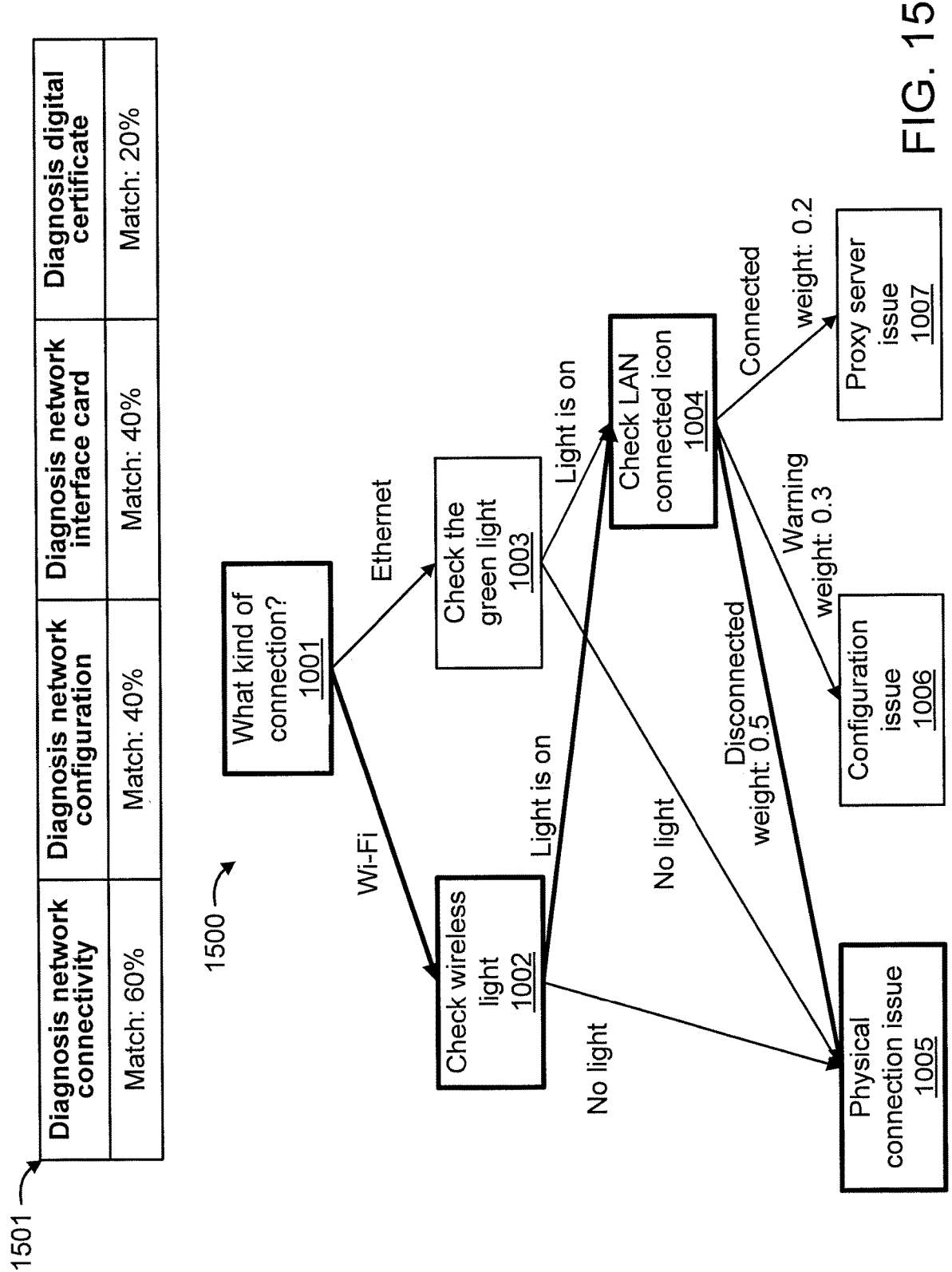
FIG. 15 is a diagram showing an exemplary tree to which the present invention can be applied, in accordance with an embodiment of the present invention.
Figure 16:
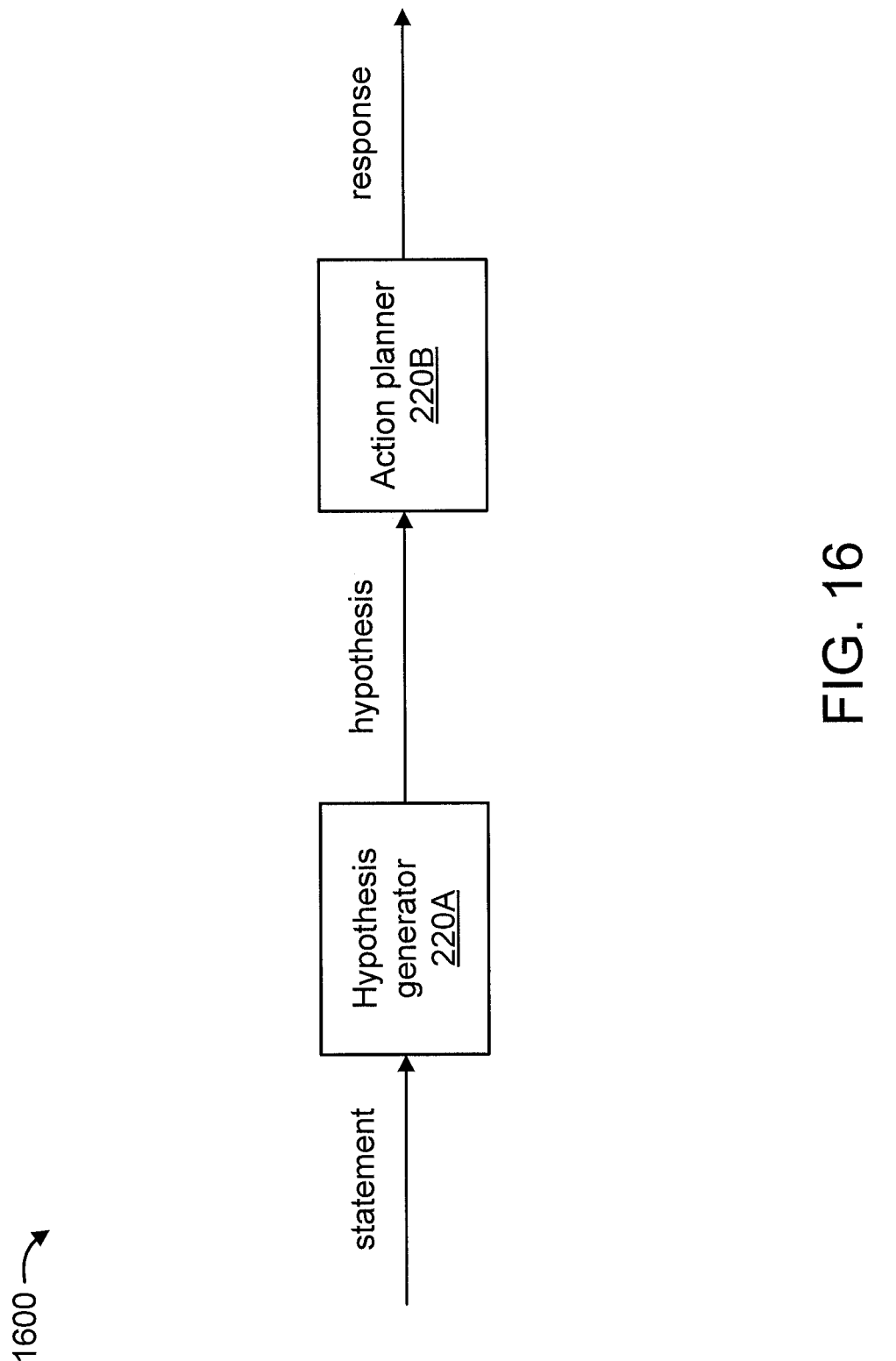
FIG. 16 is a block diagram showing an exemplary processing flow by the forest inference engine, in accordance with an embodiment of the present invention.

FIG. 15 is a diagram showing an exemplary tree 1500 to which the present invention can be applied, in accordance with an embodiment of the present invention. FIG. 16 is a block diagram showing an exemplary processing flow 1600 by the forest inference engine, in accordance with an embodiment of the present invention. FIG. 17 is a diagram showing the conversation 1700 between a user and the system 200, in accordance with an embodiment of the present invention.

The tree 1500 is a marked up version of tree 1000, with the marks (highlighted nodes) corresponding to the conversation 1700 between a user and (an agent of) the system 200. Tree 1500 differs from tree 1000 in including link weights. For example, link 1017 has a weight of 0.5, link 1018 has a weight of 0.3, and link 1019 has a weight of 0.2. Moreover, FIG. 15 also shows a table 1501 that, in turn, shows match (relevance) percentage of the conversation 1700 to the various problems shown in Table 1100 (as well as Table 1300).

The processing flow is as follows. A user provides a statement to the hypothesis generator 220A which, in turn, generates a hypothesis. The hypothesis is provided to the action planner 220B which generates a response based on the hypothesis.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
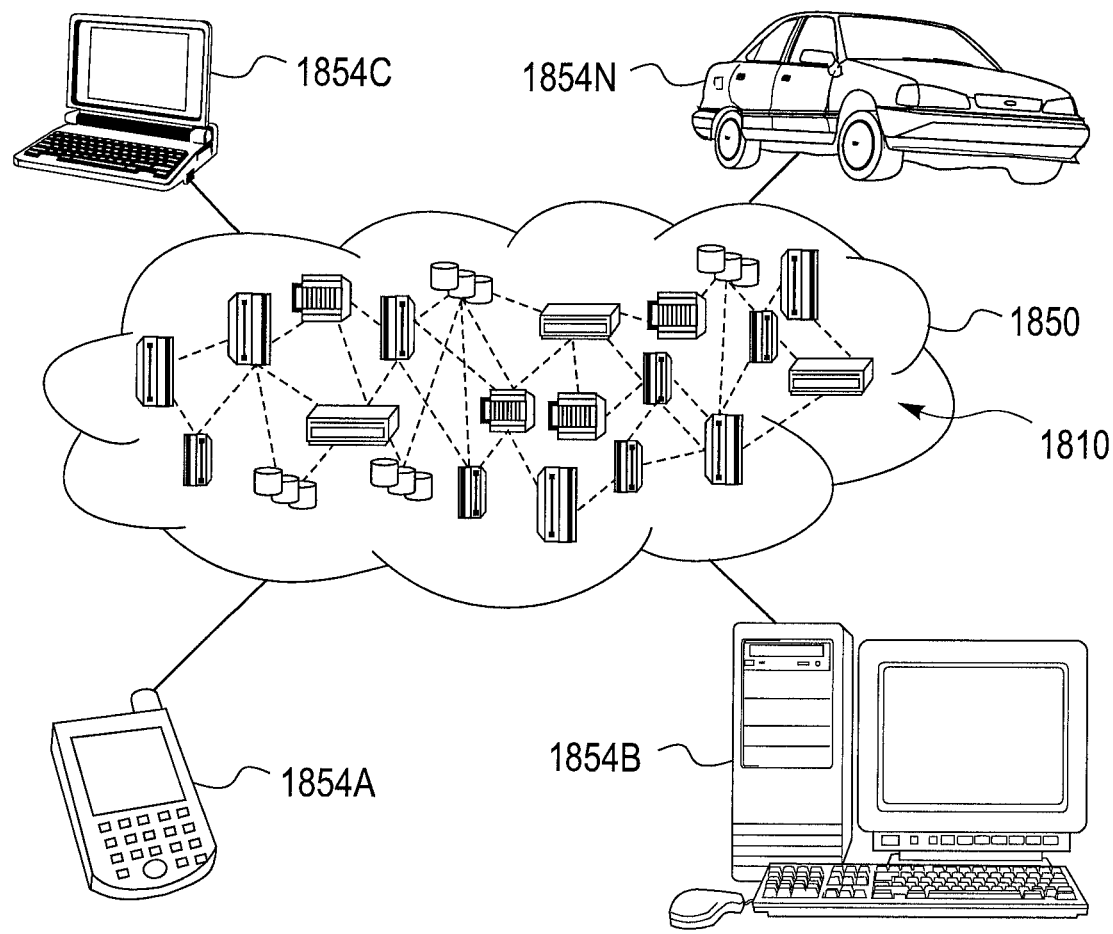
FIG. 18 is a block diagram showing an illustrative cloud computing environment having one or more cloud computing nodes with which local computing devices used by cloud consumers communicate, in accordance with an embodiment of the present invention.

Referring now to FIG. 18, illustrative cloud computing environment 1850 is depicted. As shown, cloud computing environment 1850 includes one or more cloud computing nodes 1810 with which local computing devices used by cloud consumers, such as, for example, personal digital assistant (PDA) or cellular telephone 1854A, desktop computer 1854B, laptop computer 1854C, and/or automobile computer system 1854N may communicate. Nodes 1810 may communicate with one another. They may be grouped (not shown) physically or virtually, in one or more networks, such as Private, Community, Public, or Hybrid clouds as described hereinabove, or a combination thereof. This allows cloud computing environment 1850 to offer infrastructure, platforms and/or software as services for which a cloud consumer does not need to maintain resources on a local computing device. It is understood that the types of computing devices 1854A-N shown in FIG. 18 are intended to be illustrative only and that computing nodes 1810 and cloud computing environment 1850 can communicate with any type of computerized device over any type of network and/or network addressable connection (e.g., using a web browser).

Figure 19:
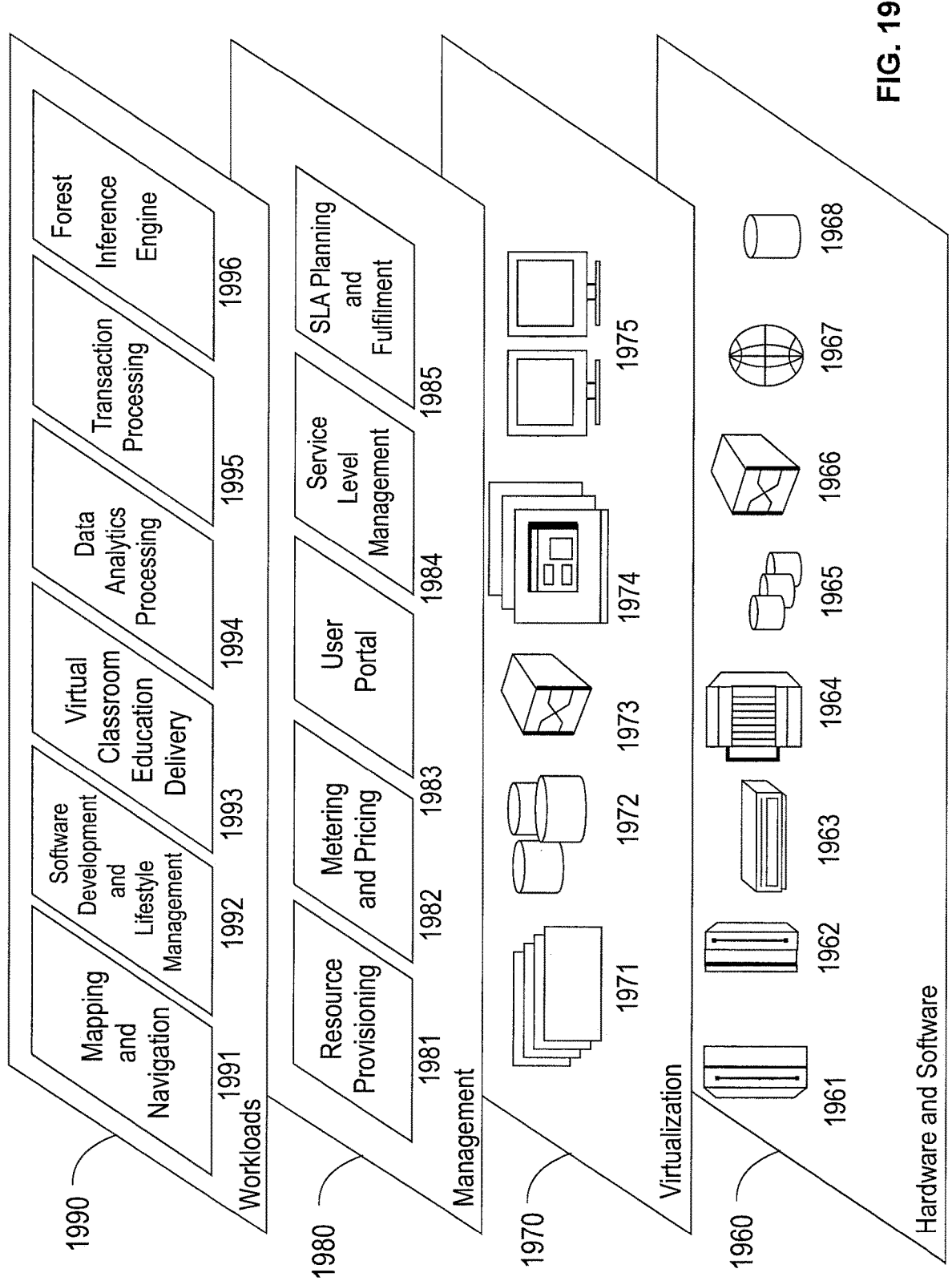
FIG. 19 is a block diagram showing a set of functional abstraction layers provided by a cloud computing environment, in accordance with an embodiment of the present invention.

Referring now to FIG. 19, a set of functional abstraction layers provided by cloud computing environment 1850 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 1960 includes hardware and software components. Examples of hardware components include: mainframes 1961; RISC (Reduced Instruction Set Computer) architecture based servers 1962; servers 1963; blade servers 1964; storage devices 1965; and networks and networking components 1966. In some embodiments, software components include network application server software 1967 and database software 1968.

Virtualization layer 1970 provides an abstraction layer from which the following examples of virtual entities may be provided: virtual servers 1971; virtual storage 1972; virtual networks 1973, including virtual private networks; virtual applications and operating systems 1974; and virtual clients 1975.

In one example, management layer 1980 may provide the functions described below. Resource provisioning 1981 provides dynamic procurement of computing resources and other resources that are utilized to perform tasks within the cloud computing environment. Metering and Pricing 1982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1983 provides access to the cloud computing environment for consumers and system administrators. Service level management 1984 provides cloud computing resource allocation and management such that required service levels are met. Service Level Agreement (SLA) planning and fulfillment 1985 provide pre-arrangement for, and procurement of, cloud computing resources for which a future requirement is anticipated in accordance with an SLA.

Workloads layer 1990 provides examples of functionality for which the cloud computing environment may be utilized. Examples of workloads and functions which may be provided from this layer include: mapping and navigation 1991; software development and lifecycle management 1992; virtual classroom education delivery 1993; data analytics processing 1994; transaction processing 1995; and forest inference engine on conversation platform 1996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or link servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating inferences from a forest of predefined problem determination trees using a processor-based conversation platform, the method comprising:
    selecting a tree from among the forest of predefined problem determination trees, responsive to user utterances uttered during an inference generating session;
    navigating the tree to allocate a relevant tree node to generate a problem diagnosis question or a problem resolution action by understanding the user utterances among common interaction patterns in problem diagnosis and problem resolution dialogs; and
    providing speech for uttering the problem diagnosis question or the problem resolution action to a user,
    wherein said selecting step comprises (i) traversing entry points of the trees and transferring each of the entry points to a respective vector $Vi$, (ii) transferring the user utterances to a vector $V0$, (iii) calculating, for each of the entry points, a distance $di$ between the vector $V0$ and the vector $Vi$, wherein the selected tree has a minimum distance between a given one of the entry points corresponding to the selected tree and the user utterances.

2. The computer-implemented method of claim 1, further comprising selecting and applying an applicable answer handler, from a set of answer handlers, to at least some of the user utterances.

3. The computer-implemented method of claim 2, wherein the set of answer handlers comprises a forward answer handler for processing additional information from the user to add to a given tree node, the forward answer handler having (i) a memory mode for adding the additional information to the given tree node responsive to the additional information meeting a threshold relevance, and (ii) a bypass mode for sending a question to the user responsive to the given tree node lacking a relevant answer relative to the user utterances.

4. The computer-implemented method of claim 1, wherein the set of answer handlers comprises a repairing answer handler for using at least some of the user utterances to repair an existing answer, based on a user intent determined from the user utterances.

5. The computer-implemented method of claim 1, wherein the selecting step comprises switching from one predefined problem determination tree to another predefined problem determination tree from among the forest of predefined problem determination trees.

6. The computer-implemented method of claim 1, wherein the common interaction patterns used to understand the user utterances comprise a no answer pattern relating to when a user fails to provide an answer to a question posed by the system to understand the user utterances.

7. The computer-implemented method of claim 6, further comprising traversing a path through the forest having a highest probability based on historical conversational records, responsive to the common interaction pattern comprising the no answer pattern.

8. The computer-implemented method of claim 1, wherein said selecting step comprises transforming the user utterances into a set of key value pairs.

9. The computer-implemented method of claim 8, wherein the common interaction patterns used to understand the user utterances comprise a jumping answer pattern relating to the user utterances including additional information other than that requested by a system end of the conversation platform and pertaining to a different problem than originally identified from the user utterances, wherein the additional information in transformed into one or more key value pairs that are merged with existing key value pairs stored by the system end for reevaluation and assignment to a corresponding one of the trees.

10. A computer program product for generating inferences from a forest of predefined problem determination trees using a processor-based conversation platform, the computer program product comprising a non-transitory computer readable storage medium having program instructions embodied therewith, the program instructions executable by a computer to cause the computer to perform a method comprising:
    selecting a tree from among the forest of predefined problem determination trees, responsive to user utterances uttered during an inference generating session;
    navigating the tree to allocate a relevant tree node to generate a problem diagnosis question or a problem resolution action by understanding the user utterances among common interaction patterns in problem diagnosis and problem resolution dialogs; and
    providing speech for uttering the problem diagnosis question or the problem resolution action to a user, wherein said selecting step comprises (i) traversing entry points of the trees and transferring each of the entry points to a respective vector Vi, (ii) transferring the user utterances to a vector V0, (iii) calculating, for each of the entry points, a distance di between the vector V0 and the vector Vi, wherein the selected tree has a minimum distance between a given one of the entry points corresponding to the selected tree and the user utterances.

11. The computer program product of claim 10, wherein the method further comprises selecting and applying an applicable answer handler, from a set of answer handlers, to at least some of the user utterances.

12. The computer program product of claim 11, wherein the set of answer handlers comprises a forward answer handler for processing additional information from the user to add to a given tree node, the forward answer handler having (i) a memory mode for adding the additional information to the given tree node responsive to the additional information meeting a threshold relevance, and (ii) a bypass mode for sending a question to the user responsive to the given tree node lacking a relevant answer relative to the user utterances.

13. The computer program product of claim 10, wherein the set of answer handlers comprises a repairing answer handler for using at least some of the user utterances to repair an existing answer, based on a user intent determined from the user utterances.

14. The computer program product of claim 10, wherein the selecting step comprises switching from one predefined problem determination tree to another predefined problem determination tree from among the forest of predefined problem determination trees.

15. The computer program product of claim 10, wherein the common interaction patterns used to understand the user utterances comprise a no answer pattern relating to when a user fails to provide an answer to a question posed by the system to understand the user utterances.

16. The computer program product of claim 15, wherein the method further comprises traversing a path through the forest having a highest probability based on historical conversational records, responsive to the common interaction pattern comprising the no answer pattern.

17. The computer program product of claim 10, wherein said selecting step comprises transforming the user utterances into a set of key value pairs.

18. A computer processing system for generating inferences from a forest of predefined problem determination trees using a processor-based conversation platform, the system comprising:
a memory for storing program code; and
a processor operatively coupled to the memory for running the program code to
select a tree from among the forest of predefined problem determination trees, responsive to user utterances uttered during an inference generating session;
navigate the tree to allocate a relevant tree node to generate a problem diagnosis question or a problem resolution action by understanding the user utterances among common interaction patterns in problem diagnosis and problem resolution dialogs; and
provide speech for uttering the problem diagnosis question or the problem resolution action to a user,
wherein the processor selects the tree by (i) traversing entry points of the trees and transferring each of the entry points to a respective vector Vi, (ii) transferring the user utterances to a vector V0, and (iii) calculating, for each of the entry points, a distance di between the vector V0 and the vector Vi, wherein the selected tree has a minimum distance between a given one of the entry points corresponding to the selected tree and the user utterances.

* * * * *